US010838046B2

(12) United States Patent
Qiu et al.

(10) Patent No.: US 10,838,046 B2
(45) Date of Patent: Nov. 17, 2020

(54) MULTILINE LIDAR

(71) Applicant: SUTENG INNOVATION TECHNOLOGY CO., LTD., Guangdong (CN)

(72) Inventors: Chunxin Qiu, Guangdong (CN); Letian Liu, Guangdong (CN)

(73) Assignee: Suteng Innovation Technology Co., LTD., Shenzhen (CN)

( * ) Notice: Subject to any disclaimer, the term of this patent is extended or adjusted under 35 U.S.C. 154(b) by 348 days.

(21) Appl. No.: 15/748,320

(22) PCT Filed: May 10, 2016

(86) PCT No.: PCT/CN2016/081479
§ 371 (c)(1),
(2) Date: Jan. 29, 2018

(87) PCT Pub. No.: WO2017/193269
PCT Pub. Date: Nov. 16, 2017

(65) Prior Publication Data
US 2018/0217240 A1 Aug. 2, 2018

(51) Int. Cl.
G01C 3/00 (2006.01)
G01S 7/4863 (2020.01)
(Continued)

(52) U.S. Cl.
CPC .......... G01S 7/4863 (2013.01); G01S 7/4813 (2013.01); G01S 7/4815 (2013.01); G01S 7/4816 (2013.01);
(Continued)

(58) Field of Classification Search
CPC .... G01S 7/4815; G01S 7/4816; G01S 7/4863; G01S 7/4813; G01S 7/4868; G01S 17/42; G01S 17/10
(Continued)

(56) References Cited

U.S. PATENT DOCUMENTS 9,377,533 B2 * 6/2016 Smits ...................... G01S 7/497
2010/0020306 A1 * 1/2010 Hall ....................... H01S 5/0428
356/5.01
(Continued)

FOREIGN PATENT DOCUMENTS

| CN | 101813778 A | 8/2010 |
| CN | 102338875 A | 2/2012 |
| CN | 103278808 A | 9/2013 |

OTHER PUBLICATIONS

International Search Report for International Application No. PCT/CN2016/081479 dated Feb. 7, 2017.

Primary Examiner — Mark Hellner
(74) Attorney, Agent, or Firm — Rimon PC

(57) ABSTRACT

A multiline lidar includes: a laser emitting array configured to emit multi-beam laser; a laser receiving array configured to receive multiplexed laser echoes reflected by a target object; an echo sampling device configured to sample the multiplexed laser echo in a time division multiplexing manner and output a sampling data stream; a control system coupled to the laser emitting array, the laser receiving array, and the echo sampling device, respectively; the control system is configured to control operations of the laser emitting array and the laser receiving array, and determine measurement data according to the sampling data stream; and an output device configured to output the measurement data.

18 Claims, 7 Drawing Sheets

(51) Int. Cl.
  *G01S 17/10* (2020.01)
  *G01S 7/481* (2006.01)
  *G01S 17/42* (2006.01)
  G01S 7/486 (2020.01)

(52) U.S. Cl.
  CPC .............. *G01S 17/10* (2013.01); *G01S 17/42* (2013.01); *G01S 7/4868* (2013.01)

(58) Field of Classification Search
  USPC ........................................................ 356/5.01
  See application file for complete search history.

(56) References Cited

U.S. PATENT DOCUMENTS

| | | | |
|---|---|---|---|
| 2011/0216304 A1* | 9/2011 | Hall | G01S 17/89 |
| | | | 356/4.01 |
| 2016/0282468 A1* | 9/2016 | Gruver | G01C 3/02 |
| 2017/0242109 A1* | 8/2017 | Dussan | G01S 7/4863 |
| 2019/0353472 A1* | 11/2019 | Braker | G01B 11/2536 |

* cited by examiner

MULTILINE LIDAR

FIELD OF THE INVENTION

The present disclosure relates to the field of laser detection, and more particularly relates to a multiline lidar (light detection and ranging).

BACKGROUND OF THE INVENTION

"Radar" is an electronic device that uses electromagnetic wave to detect the position of a target. It is mainly used to detect the movement parameters such as distance, velocity, and angular position of the target. The radar includes ultrasonic radar, microwave radar and lidar. The lidar completes the detection task by using the laser. Conventional lidar is used in fixed-point detections, however, when the lidar is used in multiline measurement, the measuring speed cannot meet the requirements, hence it cannot meet the real-time requirements.

SUMMARY OF THE INVENTION

Accordingly, it is necessary to provide a multiline lidar with a high real-time ability.

A multiline lidar includes: a laser emitting array configured to emit multi-beam laser; a laser receiving array configured to receive multiplexed laser echoes reflected by a target object; an echo sampling device configured to sample the multiplexed laser echo in a time division multiplexing manner and output a sampling data stream; a control system coupled to the laser emitting array, the laser receiving array, and the echo sampling device, respectively; wherein the control system is configured to control operations of the laser emitting array and the laser receiving array, and determine measurement data according to the sampling data stream; and an output device configured to output the measurement data.

According to the aforementioned multiline lidar, the laser emitting array can emit multi-beam laser, the laser receiving array is configured to receive multiplexed laser echoes reflected by the target object. The echo sampling device is configured to sample the multiplexed laser echo received by the laser receiving array in the time division multiplexing manner and output the sampling data stream to the control system, such that the control system can determine the measurement data and outputs it through the output device. According to the aforementioned multiline lidar, the sampling is performed via the time division multiplexing manner, and a real-time processing is performed by the control system, such that the real-time ability of the measuring process is enhanced.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

Embodiments of the invention are described more fully hereinafter with reference to the accompanying drawings. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
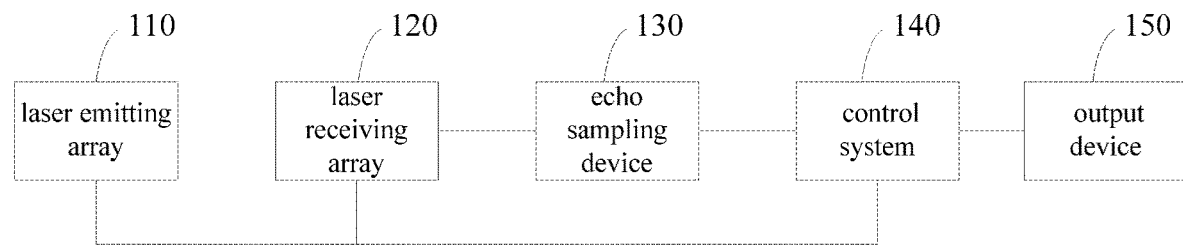
FIG. 1 is a block diagram of a multiline lidar according to one embodiment.

FIG. 1 is a block diagram of a multiline lidar according to one embodiment. The multiline lidar includes a laser emitting array 110, a laser receiving array 120, an echo sampling device 130, a control system 140, and an output device 150.

The laser emitting array 110 is configured to emit multi-beam laser. The laser emitted by the laser emitting array 110 is pulsed laser. The laser emitting array 110 includes a plurality of laser emitters arranged in an array.

The laser receiving array 120 is configured to receive multi-beam pulsed laser reflected by a target object. The laser receiving array 120 also includes a plurality of laser receivers arranged in an array. The laser receivers have the same number as that of the laser emitters. In alternative embodiments, the arrangement of the laser emitting array 110 and the laser receiving array 120 may be configured according to actual needs.

The echo sampling device 130 is coupled to the laser receiving array 120. The echo sampling device 130 is configured to sample the laser echo received by the laser receiving array 120 in a time division multiplexing manner, and a sampling data stream is generated and output. The sampling of the multiplexed laser echo is performed by the time division multiplexing manner, such that the sampling efficiency is increased, and the real-time ability of the measuring process is enhanced. The echo sampling device 130 has a sampling frequency of an order of the gigabit samples per second (GSPS), such that the obtained sampling data stream is a data stream of an order of GSPS (i.e., high speed sampling data stream). In the illustrated embodiment, the echo sampling device 130 is an analog-to-digital conversion (ADC) sampling device, and an obtained data stream is a high speed data stream of 600000 echo signal per second. The data stream is a data stream quantized by 8 bit ADC.

The control system 140 is coupled to the laser emitting array 110, the laser receiving array 120, and the echo sampling device 130, respectively. The control system 140 is configured to control operations of the laser emitting array 110, the laser receiving array 120, and the echo sampling device 130. In addition, the control system 140 is configured to determine measurement data according to the sampling data stream. Specifically, the control system 140 can be implemented via a field programmable gate array (FPGA).

Figure 2:
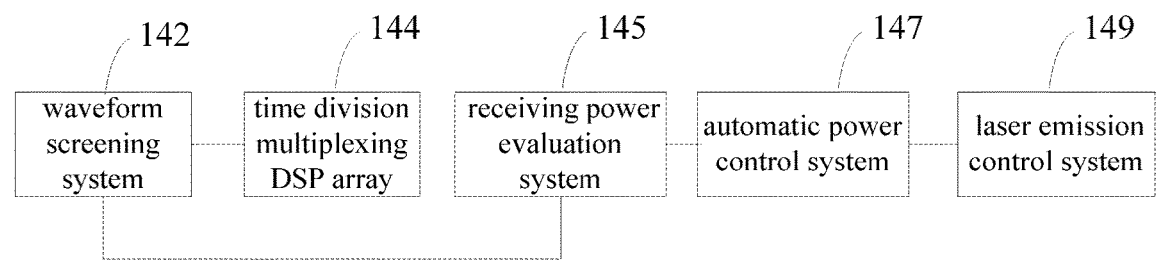
FIG. 2 is a block diagram of a control system of FIG. 1.

Referring to FIG. 2, the control system 140 includes a waveform screening system 142 and a time division multiplexing digital signal processing (DSP) array 144. The waveform screening system 142 is configured to screen an echo that satisfies a preset waveform condition from the sampling data stream. The preset waveform condition can be the parameter of the peak or phase of the waveform. Specifically, the waveform screening system 142 stores a preset waveform template therein. Therefore, the waveform screening system 142 matches the waveform in the sampling data stream with the preset waveform template, and determines whether the waveform in the sampling data stream satisfies the preset waveform condition according to the degree of matching. After extracting the data point sequence containing the waveform satisfying the preset waveform condition, the waveform screening system 142 sends the packed data to the time division multiplexed DSP array 144. The time division multiplexed DSP array 144 is constructed by FPGA logic resources and multipliers. The time division multiplexed DSP array 144 performs a series of multiplication and iterative operations on the screened data to obtain time interval information representing the distance information. The time division multiplexed DSP array 144 is further configured to convert the obtained time interval information into the distance information, and send the packed data combined with other ancillary information. The time interval information is converted to distance information using the formula as follows:

$$D=T*Ca/2$$

where D represents distance, Ca represents the speed of light in the air, T represents time interval, which is an absolute value of the difference between the echo and the reference signal and the template correlation at which the maximum value is reached. By packing and sending the obtained distance information along with other auxiliary information such as point serial number, channel attenuation value, and test information, it is helpful to improve the stability and security of the data transmission process. In an alternative embodiment, the echo sampling device 130 can be integrated into the control system 140.

The output device 150 is configured to output the measurement data output by the control system 140. In the illustrated embodiment, the output device 150 is an output interface. In alternative embodiments, the output device 150 can be a display device that outputs the measurement data directly.

According to the aforementioned multiline lidar, the laser emitting array 110 can emit multi-beam laser, the laser receiving array 120 is configured to receive multiplexed laser echoes reflected by the target object. The echo sampling device 130 is configured to sample the multiplexed laser echo received by the laser receiving array 120 in the time division multiplexing manner and output the sampling data stream to the control system 140, such that the control system 140 can determine the measurement data and outputs it through the output device 150. According to the aforementioned multiline lidar, the sampling is performed via the time division multiplexing manner, and a real-time processing is performed by the control system 140, such that the real-time ability of the measuring process is enhanced. In the meantime, the control system 140 calculates and processes the data via the time division multiplexing DSP array, thus the real-time ability of the measuring process is further enhanced.

In one embodiment, referring to FIG. 2, the control system 140 further includes a receiving power evaluation system 145, an automatic power control system 147, and a laser emission control system 149, which are successively coupled. The receiving power evaluation system 145 is coupled to the waveform screening system 142 and is configured to calculate a power value of the echo based on the screening results of the waveform screening system 142. The automatic power control (AGC) system 147 is configured to calculate a power compensation value according to the obtained power value. The laser emission control system 149 is configured to adjust a transmission power according to the power compensation value to compensate the optical path attenuation, such that the echo energy obtained the next time can be within the expected power range, thus obtaining an echo signal with good signal-to-noise ratio, and is conducive to improve the accuracy of the measurement.

Figure 3:
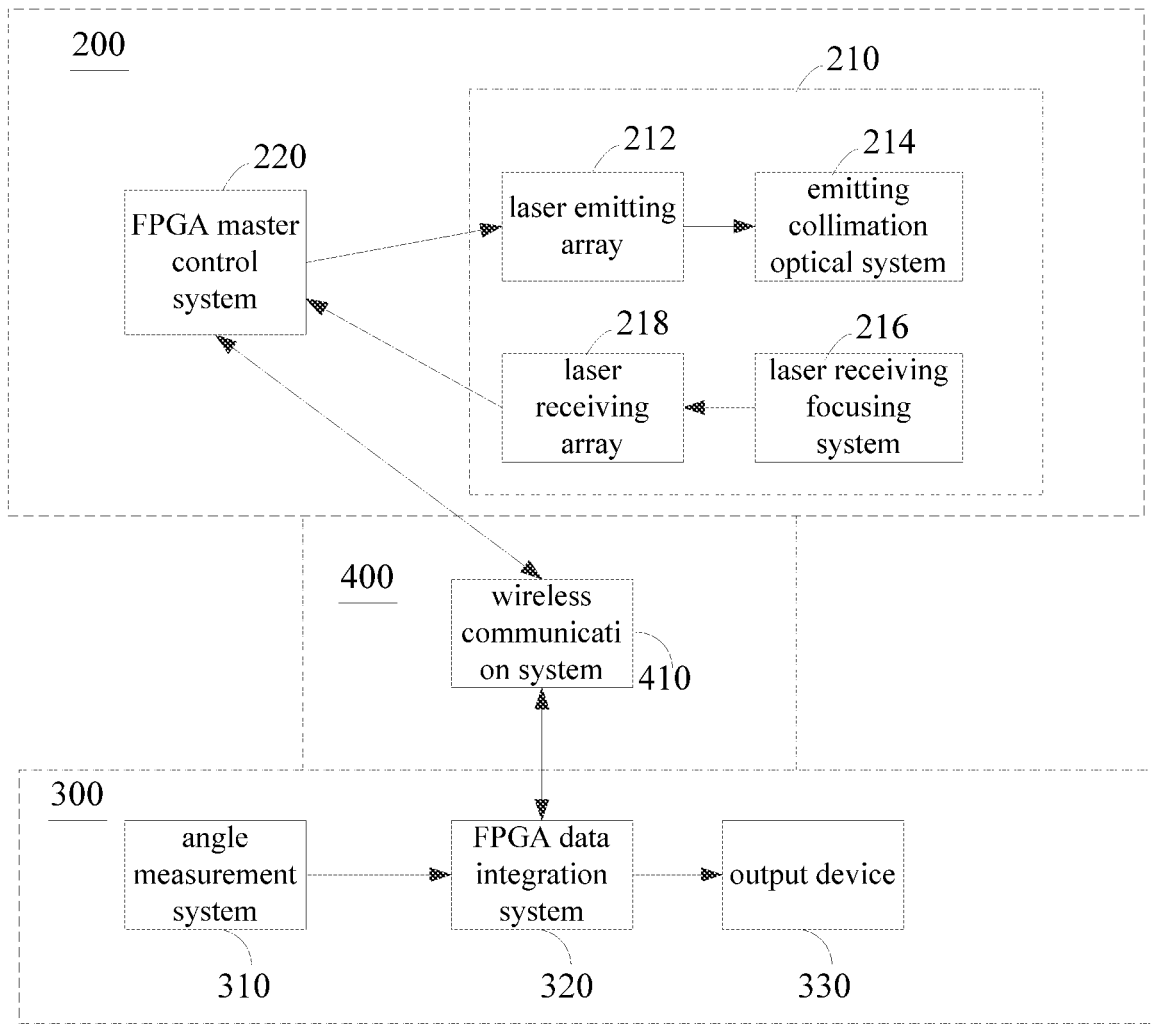
FIG. 3 is a block diagram of a multiline lidar according to another embodiment.

FIG. 3 is a block diagram of a multiline lidar according to another embodiment. The multiline lidar includes a rotation portion 200, a fixing portion 300, and a rotation mechanism 400. The rotation portion 200 is connected to the fixing portion 300 via the rotation mechanism 400. The rotation portion 200 includes a distance measuring system 210 and an FPGA master control system 220, which are connected to each other. The fixing portion 300 includes an angle measurement system 310, an FPGA data integration system 320, and an output device 330. The FPGA master control system 220 and the FPGA data integration system 320 form the control system of the multiline lidar. The rotation mechanism 400 is provided with a wireless communication system 410 with energy therein. The FPGA master control system 220 communicates with the FPGA data integration system 320 via the wireless communication system.

In the foregoing multiline lidar, the FPGA master control system 220 is connected to the distance measuring system 210 and is disposed on the rotation portion 200. The FPGA data integration system 320 is connected to the angle measurement system 310 and the output device 330, and is disposed on the fixing portion 300. The FPGA master control system 220 communicates with the FPGA data integration system 320 via the wireless communication system 410, thus forming the control system of the multiline lidar. Since the FPGA master control system 220 and the FPGA data integration system 320 are independently configured on the rotation portion 200 and the fixing portion 300, respectively, the stability of the system is increased.

In the illustrated embodiment, the distance measuring system 210 includes a laser emitting array 212, an emitting collimation optical system 214, a laser receiving focusing system 216, and a laser receiving array 218. The laser emitting array 212 is used to transmit multi-beam (e.g., 4, 8, 16, 32, 64) pulsed lasers. The number of beams of multi-beam lasers can be configured as required, such as an even number. The emitting collimation optical system 214 is arranged on a light outgoing side of the laser emitting array 212. The emitting collimation optical system 214 is configured to collimate the multi-beam laser emitted by the laser emitting array 212. The laser receiving focusing system 216 is arranged on an incident light side of the laser receiving array 218. The laser receiving focusing system 216 is configured to focus each laser echo reflected by the target object and then output it to the laser receiving array 218. The laser receiving array 218 is configured to receive the multiplexed laser echo focused by the laser receiving focusing system 216. By focusing the incident light and collimating the outgoing light, the accuracy of the measurement is advantageously improved. The FPGA master control system 210 is configured to control the laser emitting array 212 and the laser receiving array 218. The FPGA master control system 210 is further configured to determine measuring data (distance information) according to the received multiplexed laser echo. The operation of the FPGA master system 210 has been described in the foregoing embodiments and will not be described here.

The angle measurement system 310 is configured to measure a rotation angle of the rotation portion 200 and output it to the FPGA data integration system 320. The angle measurement system 310 may be implemented using a high precision rotary angle measurement system commonly used in the art. The FPGA data integration system 320 is configured to receive the angle information output from the angle measurement system 310 and a distance information output from the FPGA master control system 220, thus generating a measuring date with angle, which is output via the output device 330. The output device 330 may be a multi-beam laser ranging data output interface or a display device capable of displaying.

Figure 4:
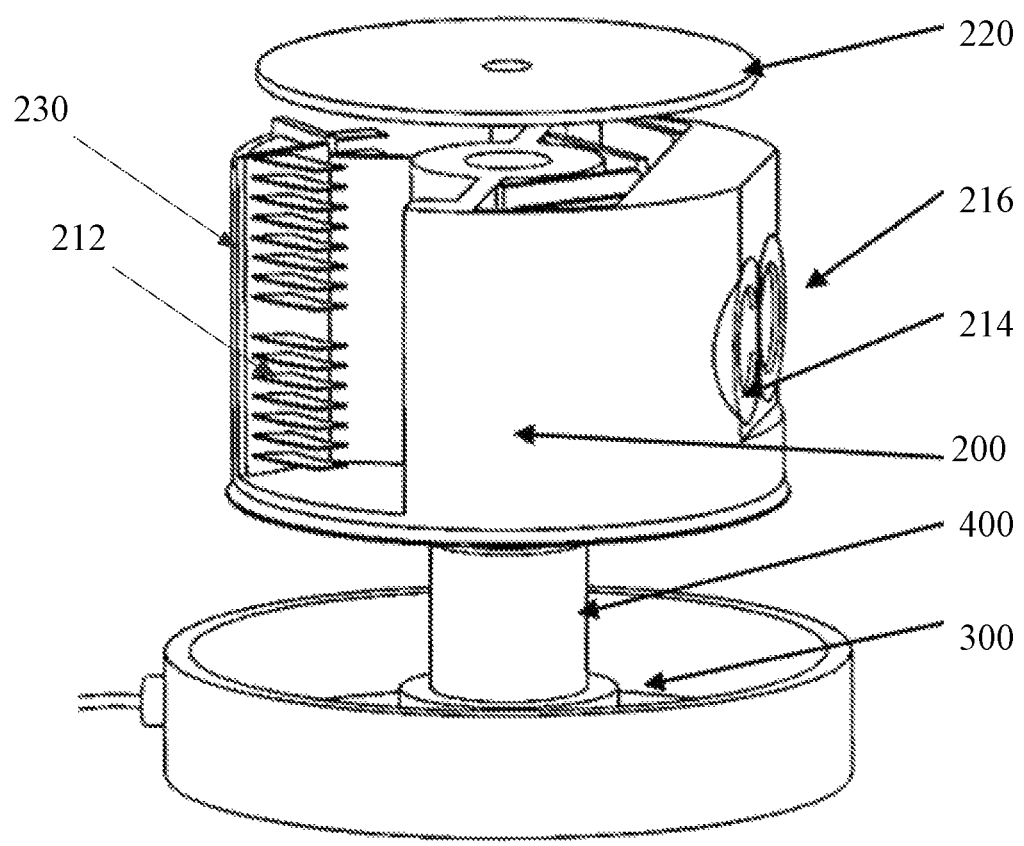
FIG. 4 is a schematic view of a multiline lidar according to another embodiment.
Figure 5:
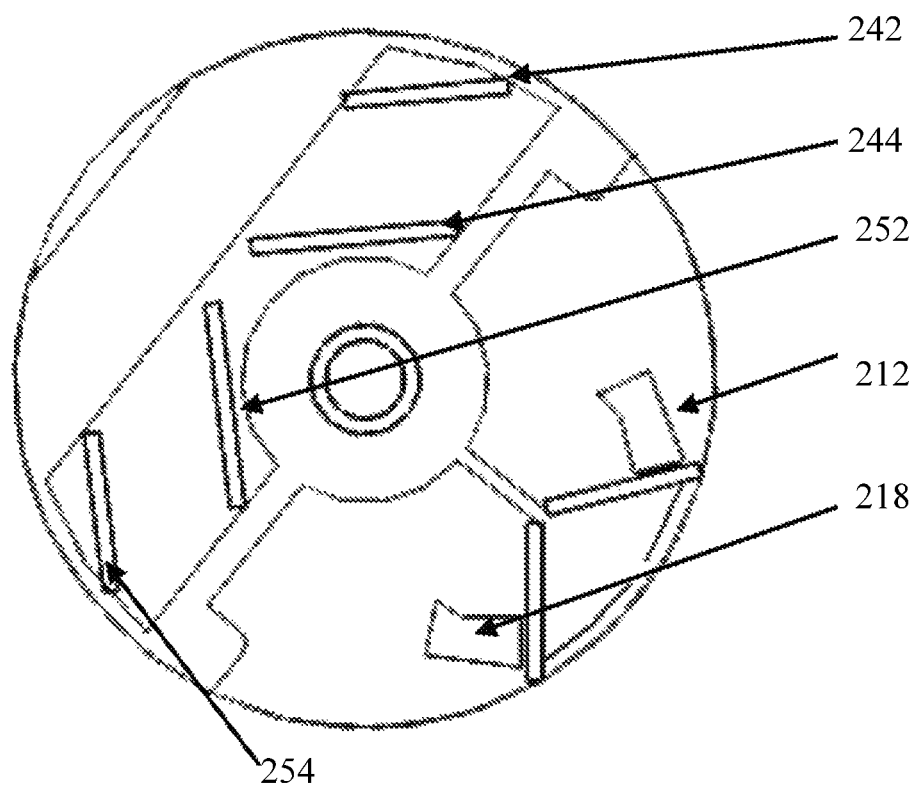
FIG. 5 is a top plan view of FIG. 4.
Figure 6:
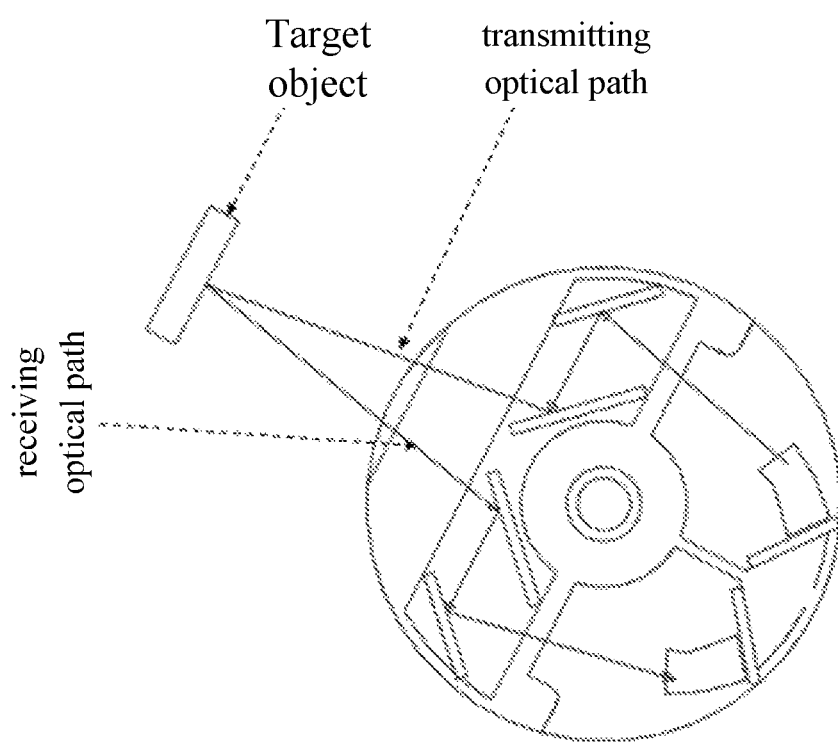
FIG. 6 is a schematic view showing the emitting optical paths and the receiving optical paths of the multiline laser radar of FIG. 4.

FIG. 4 is a schematic view of a multiline lidar according to another embodiment, and FIG. 5 is a top plan view of FIG. 4. In the illustrated embodiment, the rotation portion 200 includes a bracket 230. The laser emitting array 212 and the laser receiving array 218 are respectively fixed on both sides of the bracket 230 and are separated by the bracket 230. Additionally, the plurality of laser emitters of the laser emitting array 212 and the plurality of laser receivers of the laser receiving array 218 are vertically spaced along the bracket 230. In the illustrated embodiment, a surface of the bracket located by the plurality of laser emitters and the plurality of laser receivers is a curved surface. An angle formed between the outgoing light of the laser emitting array 212 and the incident light of the laser receiving array 218 is 90°. The distance measuring system 210 further includes a transmitting optical path system and a receiving optical path system. The transmitting optical path system is arranged between the laser emitting array 212 and the emitting collimation optical system 214. The transmitting optical path system is configured to control the multi-beam laser to emit along a direction parallel to an outgoing light of the laser emitting array 212. Specifically, the transmitting optical path system includes a first optical lens 242 and a second optical lens 244. The first optical lens 242 and the second optical lens 244 are arranged in parallel, and both of which forms an angle of 45° with the outgoing light of the laser emitting array 212. Meanwhile, the reflecting surfaces of the first optical lens 242 and the second optical lens 244 are arranged facing the laser emitting array 212. The receiving optical path system is arranged between the laser receiving focusing system 216 and the laser receiving array 218. The receiving optical path system is configured to control the multi-beam laser to output along a reflection direction of the laser echo to the laser receiving array 218. Specifically, the receiving optical path system includes a third optical lens 252 and a fourth optical lens 254. The third optical lens 252 and the fourth optical lens 254 are arranged in parallel, both of which form an angle of 45° with the incident light of the laser receiving array 218. The third optical lens 252 and the fourth optical lens 254 are arranged facing the laser receiving array 218. The schematic diagram of the transmitting optical path and the receiving optical path are shown in FIG. 6. The laser emitted by the plurality of laser emitters in the laser emitting array 212 is reflected by 90° by the first optical lens 242 mounted in front of the laser emitting array 212 and then emitted to the second optical lens 244 mounted in front of the first optical lens 242. The laser is emitted to the emitting collimation optical system 214 after being reflected by 90° by the first optical lens 242, and then is collimated by the emitting collimation optical system 214 and then is incident to the target object (or object to be detected). The laser is reflected by the detecting object and is incident on the laser receiving focusing system 216. The laser is focused by the laser receiving focusing system 216 and then incident on the third optical lens 252. The laser is reflected by 90° by the third optical lens 252 and then incident on the fourth optical lens 254. The laser is reflected by 90° by the fourth optical lens 254 and then incident on the laser receiving array 218. In the illustrated embodiment, the first optical lens 242, the second optical lens 244, the third optical lens 252, and the fourth optical lens 254 are all ordinary optical lenses.

Figure 7:
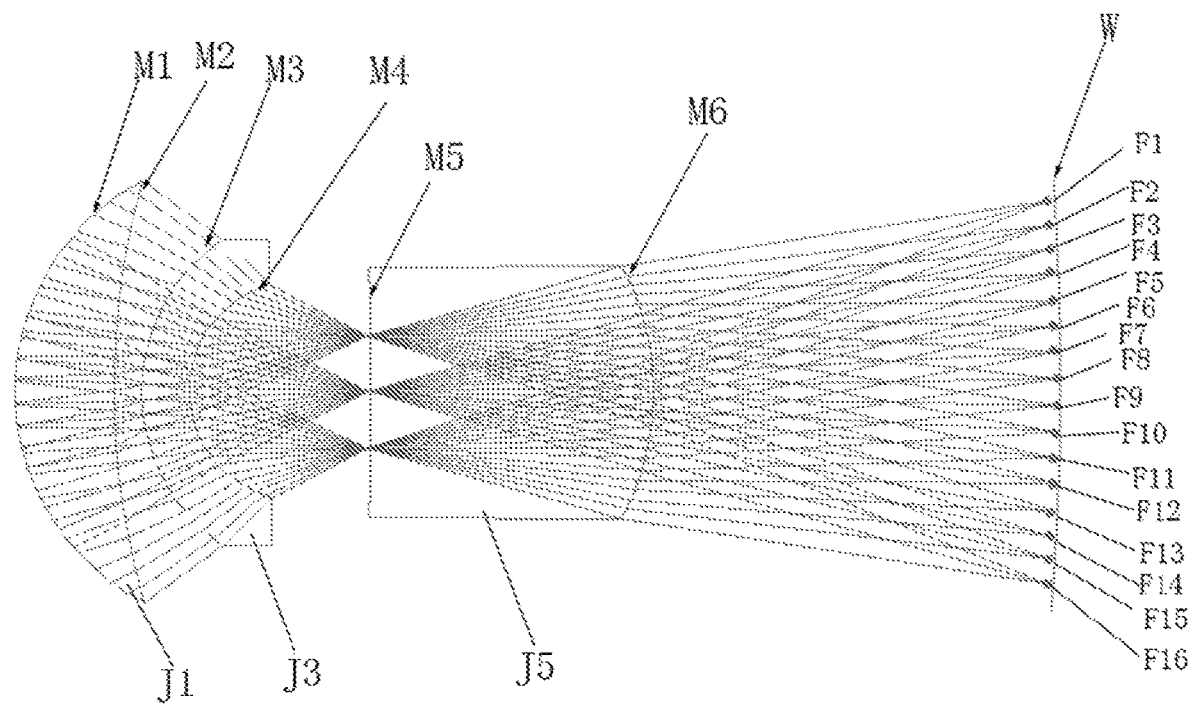
FIG. 7 is a schematic view of an emitting collimation optical system of FIG. 4.

In the illustrated embodiment, the emission collimation optical system 214 is a large field collimation system. The emission collimation optical system 214 includes a plurality of collimation emitting lens (not shown). The plurality of collimation emitting lens are disposed on an arcuate surface, which has a radius of 200 mm. The laser receiving focusing system 216 includes a plurality of focus receiving lens (not shown). The plurality of focus receiving lens are disposed on an arcuate surface, which has a radius of 200 mm. In the illustrated embodiment, an arc formed by the collimation emitting lens and an arc formed by the focus receiving lens have the same center, and the collimation emitting lens and the focus receiving lens are within 30° of the center of the circle. Referring to FIG. 7, the emission collimation optical system 214 further includes a third lens J5, a second lens J3, and a first lens J1, which are coaxially arranged in series along a direction of the outgoing light of the laser emitting array 212. Referring to FIG. 7, the laser emitting array 212 includes sixteen laser emitters F1 to F16. The sixteen laser emitters F1 to F16 are fixed on a laser bracket W, which is a circular bracket. In the illustrated embodiment, the first lens J1 is a positive meniscus lens, and curved surfaces of the first lens J1 are bent towards the laser emitting array. The second lens J3 is a negative meniscus lens, curved surfaces of the second lens J3 are bent towards the emitting direction of the laser emitting array. The third lens J5 is a positive meniscus lens, curved surfaces of the third lens J5 are bent towards the emitting direction of the laser emitting array. M1, M2, M3, M4, M5, M6 are surfaces of lens J1, J3, J5, respectively. In the illustrated embodiment, the positive lens is a lens having a center thickness greater than the thickness of the edge, and the negative lens is a lens having a center thickness less than the edge of the lens. The negative sign indicates the propagation direction along the light. Based on the intersection of the spherical surface and the main optical axis, if the spherical center of the ball is on the left, then the radius of curvature is negative, on the contrary, if the spherical center of the ball is on the right, the radius of curvature is positive. The specific parameters can be configured as: the surface M1 has a radius of 15.6 mm, the surface M2 has a radius of 58.33 mm, the surface M3 has a radius of 14.011 mm, the mirror M4 has a radius of 7.508 mm, the mirror M5 has a radius of −156.575 mm, and the mirror M6 has a radius of −19.31 mm. The inner radius of the arc-shaped bracket W is −200.058 mm. A glass thickness between surface M1 and surface M2 is 7.33 mm, the refractive index of the material is 1.49, the Abbe number is 55.3, the aperture is 31.7 mm. A thickness between surface M2 and surface M3 is 2 mm, the material is air. A glass thickness between surface M3 and surface M4 is 3.59 mm, the refractive index of the material is 1.59, the Abbe number is 30.9, the aperture is 23 mm. A thickness between surface M5 and surface M6 is 13.57 mm, the material is air. A glass thickness between surface M5 and surface M6 is 21.3 mm, the refractive index of the material is 1.50, the Abbe number is 56.41, the aperture is 19 mm. A distance from the surface M6 to an inner curved surface of the laser bracket W is 31.168 mm. The above parameters are only a specific example, in alternative embodiments, the parameters may be adaptively adjusted as desired.

Figure 8:
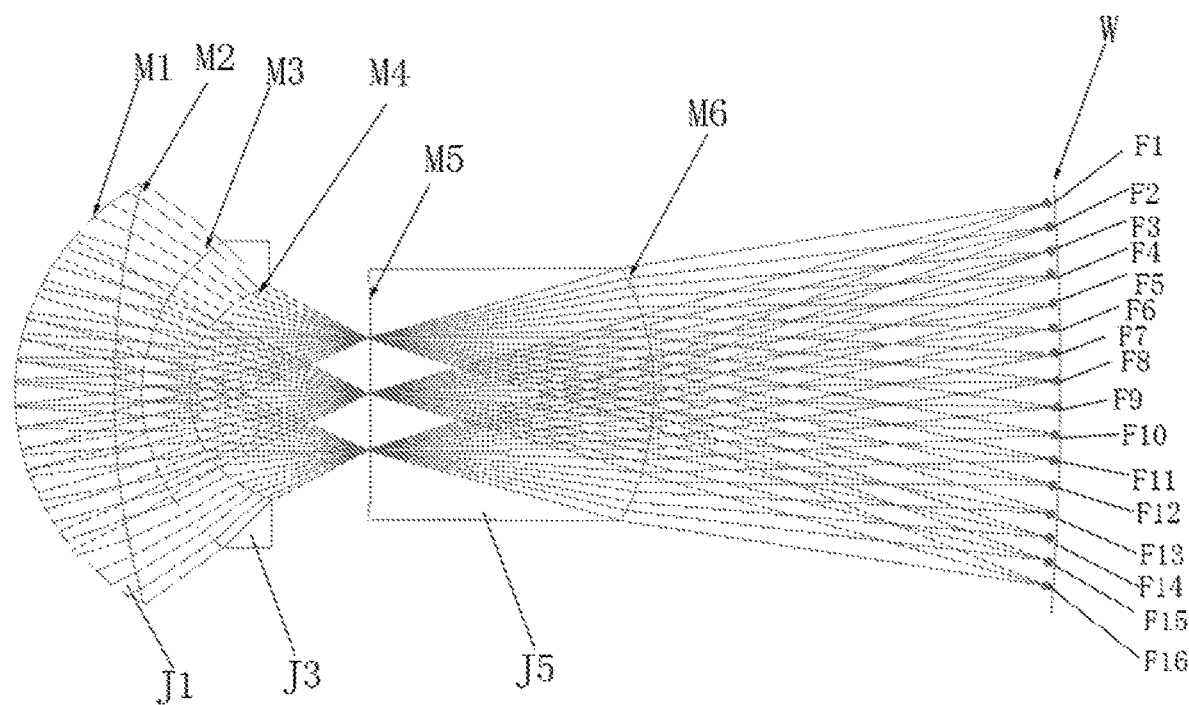
FIG. 8 is a schematic view of a laser receiving focusing system of FIG. 4.

Referring to FIG. 8, the laser receiving focusing system 216 further includes a fourth lens J2, a fifth lens J4, and a sixth lens J6, which are coaxially arranged in series along an incident light direction. Referring to FIG. 8, the laser receiving array 218 includes sixteen laser emitters P1 to P16. The sixteen laser emitters P1 to P16 are fixed on a laser bracket W, which is a circular bracket. The laser receiving focusing system 216 has the same structure as that of the emission collimating system 214, which will not described here.

The above-mentioned multiline lidar has a simple structure, good stability, and can meet the real-time requirements.

Although the respective embodiments have been described one by one, it shall be appreciated that the respective embodiments will not be isolated. Those skilled in the art can apparently appreciate upon reading the disclosure of this application that the respective technical features involved in the respective embodiments can be combined arbitrarily between the respective embodiments as long as they have no collision with each other.

Although the description is illustrated and described herein with reference to certain embodiments, the description is not intended to be limited to the details shown. Modifications may be made in the details within the scope and range equivalents of the claims.

What is claimed is:

1. A multiline lidar, comprising:
a laser emitting array configured to emit multi-beam laser;
a laser receiving array configured to receive multiplexed laser echoes reflected by a target object;
an echo sampling device configured to sample the multiplexed laser echo in a time division multiplexing manner and output a sampling data stream;
a control system coupled to the laser emitting array, the laser receiving array, and the echo sampling device, respectively; wherein the control system is configured to control operations of the laser emitting array and the laser receiving array, and determine measurement data according to the sampling data stream; and
an output device configured to output the measurement data;
wherein the echo sampling device is an analog-to-digital conversion echo sampling device; the control system comprises a waveform screening system and a time division multiplexing digital signal processing array; the waveform screening system is configured to screen an echo that satisfies a preset waveform condition from the sampling data stream and output a screening result to the time division multiplexing digital signal processing array; the time division multiplexing digital signal processing array is configured to process the screening result to obtain a time interval information and determine a distance information of the target object according to the time interval information.

2. The multiline lidar according to claim 1, wherein the echo sampling device has a sampling frequency of an order of the gigabit samples per second.

3. The multiline lidar according to claim 1, wherein the control system further comprises a receiving power evaluation system, an automatic power control system, and a laser emission control system, which are coupled successively; the receiving power evaluation system is configured to calculate a power value of the echo according to the screening result of the waveform screening system; the automatic power control system is configured to calculate a power compensation value according to the power value; the laser emission control system is configured to control a transmission power of the laser emitting array according to the power compensation value.

4. The multiline lidar according to claim 1, further comprising:
an emitting collimation optical system disposed on an outgoing light side of the laser emitting array and configured to collimate the multi-beam laser emitted by the laser emitting array; and
a laser receiving focusing system disposed on an incident light side of the laser receiving array and configured to focus the multiplexed laser echoes reflected by the target object.

5. The multiline lidar according to claim 4, wherein the emitting collimation optical system comprises a collimation emitting lens, the laser receiving focusing system comprises a focus receiving lens; both of the collimation emitting lens and the focus receiving lens are fixed to an arcuate surface.

6. The multiline lidar according to claim 5, wherein an arc formed by the collimation emitting lens and an arc formed by the focus receiving lens have the same center, and the collimation emitting lens and the focus receiving lens are within 30 degrees of the center of the circle.

7. The multiline lidar according to claim 5, wherein the emitting collimation optical system further comprises a third lens, a second lens, and a first lens, which are successively coaxially arranged along an emitting direction of the laser emitting array; the third lens is a positive meniscus lens, curved surfaces of the third lens are bent toward a position where the laser emitting array is located, the second lens is a negative meniscus lens, curved surfaces of the second lens are bent toward the emitting direction of the laser emitting array; the first lens is a positive meniscus lens, and curved surfaces of the first lens are bent toward the emitting direction of the laser emitting array.

8. The multiline lidar according to claim 5, wherein the laser receiving focusing system further comprises a fourth lens, a fifth lens, and a sixth lens, which are successively coaxially arranged along the incident light; the sixth lens is a positive meniscus lens, curved surfaces of the sixth lens are bent toward a position where the laser emitting array is located, the fifth lens is a negative meniscus lens, curved surfaces of the fifth lens are bent toward the emitting direction of the laser emitting array; the fourth lens is a positive meniscus lens, and curved surfaces of the fourth lens are bent toward the emitting direction of the laser emitting array.

9. The multiline lidar according to claim 4, further comprising:
an emission optical system disposed between the laser emitting array and the emitting collimation optical system, wherein the emission optical system is configured to control the multi-beam laser to emit along a direction parallel to the outgoing light direction of the laser emitting array; and
a receiving optical system disposed between the laser receiving array and the laser receiving focusing system, wherein the receiving optical system is configured to control the multiplexed laser echoes to output along an incident direction of the laser echo into the laser receiving array.

10. The multiline lidar according to claim 9, wherein the emission optical system comprises a first optical lens and a second optical lens which are arranged in parallel; reflection surfaces of the first optical lens and the second optical lens are arranged towards the laser emitting array.

11. The multiline lidar according to claim 9, wherein the receiving optical system comprises a third optical lens and a fourth optical lens which are arranged in parallel; the third optical lens is arranged perpendicularly to the first optical lens; reflection surfaces of the third optical lens and the fourth optical lens are arranged towards the laser receiving array.

12. The multiline lidar according to claim 9, comprising a fixing portion, a rotation portion, and a rotation mechanism, wherein the fixing portion is connected to the rotation portion via the rotation mechanism; the laser emitting array, the emitting collimation optical system, the laser receiving focusing system, the laser receiving array, the echo sampling device, the emission optical system, and the receiving optical system are fixed to the rotation portion, and the output device is disposed on the fixing portion.

13. The multiline lidar according to claim 12, wherein the control system comprises a FPGA master system and a FPGA data integration system; the FPGA master system is disposed on the rotation portion; the FPGA master system is connected to the laser emitting array, the laser receiving array, and the echo sampling device, respectively; the FPGA data integration system is disposed on the fixing portion; the FPGA data integration system is connected to the output device.

14. The multiline lidar according to claim 13, wherein the rotation mechanism is provided with a wireless communication system configured to implement a communication connection between the FPGA master system and the FPGA data integration system.

15. The multiline lidar according to claim 13, wherein the fixing portion is provided with a rotation angle measuring system, the rotation angle measuring system is connected to the FPGA data integration system and configured to measure rotation angle information of the rotation portion; the FPGA master system is configured to determine the measurement data according to the sampling data stream and output the measurement data to the FPGA data integration system; the FPGA data integration system is configured to receive the rotation angle information and the measurement data and generate the measured data with angle and outputs the measured data with angle to the output device.

16. The multiline lidar according to claim 12, wherein the rotation portion further comprises a bracket, the laser emitting array and the laser receiving array are respectively fixed on both sides of the bracket and are separated by the bracket.

17. A multiline lidar, comprising:
a laser emitting array configured to emit multi-beam laser;
a laser receiving array configured to receive multiplexed laser echoes reflected by a target object;
an echo sampling device configured to sample the multiplexed laser echo in a time division multiplexing manner and output a sampling data stream;
a control system coupled to the laser emitting array, the laser receiving array, and the echo sampling device, respectively; wherein the control system is configured to control operations of the laser emitting array and the laser receiving array, and determine measurement data according to the sampling data stream;
an output device configured to output the measurement data;
an emitting collimation optical system disposed on an outgoing light side of the laser emitting array and configured to collimate the multi-beam laser emitted by the laser emitting array; and
a laser receiving focusing system disposed on an incident light side of the laser receiving array and configured to focus the multiplexed laser echoes reflected by the target object;
wherein the emitting collimation optical system comprises a collimation emitting lens, the laser receiving focusing system comprises a focus receiving lens; both of the collimation emitting lens and the focus receiving lens are fixed to an arcuate surface; and
wherein the emitting collimation optical system further comprises a third lens, a second lens, and a first lens, which are successively coaxially arranged along an emitting direction of the laser emitting array; the third lens is a positive meniscus lens, curved surfaces of the third lens are bent toward a position where the laser emitting array is located, the second lens is a negative meniscus lens, curved surfaces of the second lens are bent toward the emitting direction of the laser emitting array; the first lens is a positive meniscus lens, and curved surfaces of the first lens are bent toward the emitting direction of the laser emitting array.

18. A multiline lidar, comprising:
a laser emitting array configured to emit multi-beam laser;
a laser receiving array configured to receive multiplexed laser echoes reflected by a target object;
an echo sampling device configured to sample the multiplexed laser echo in a time division multiplexing manner and output a sampling data stream;
a control system coupled to the laser emitting array, the laser receiving array, and the echo sampling device, respectively; wherein the control system is configured to control operations of the laser emitting array and the laser receiving array, and determine measurement data according to the sampling data stream;
an output device configured to output the measurement data;
an emitting collimation optical system disposed on an outgoing light side of the laser emitting array and configured to collimate the multi-beam laser emitted by the laser emitting array;
a laser receiving focusing system disposed on an incident light side of the laser receiving array and configured to focus the multiplexed laser echoes reflected by the target object;
an emission optical system disposed between the laser emitting array and the emitting collimation optical system, wherein the emission optical system is configured to control the multi-beam laser to emit along a direction parallel to the outgoing light direction of the laser emitting array; and
a receiving optical system disposed between the laser receiving array and the laser receiving focusing system, wherein the receiving optical system is configured to control the multiplexed laser echoes to output along an incident direction of the laser echo into the laser receiving array.

* * * * *